Figure 1:
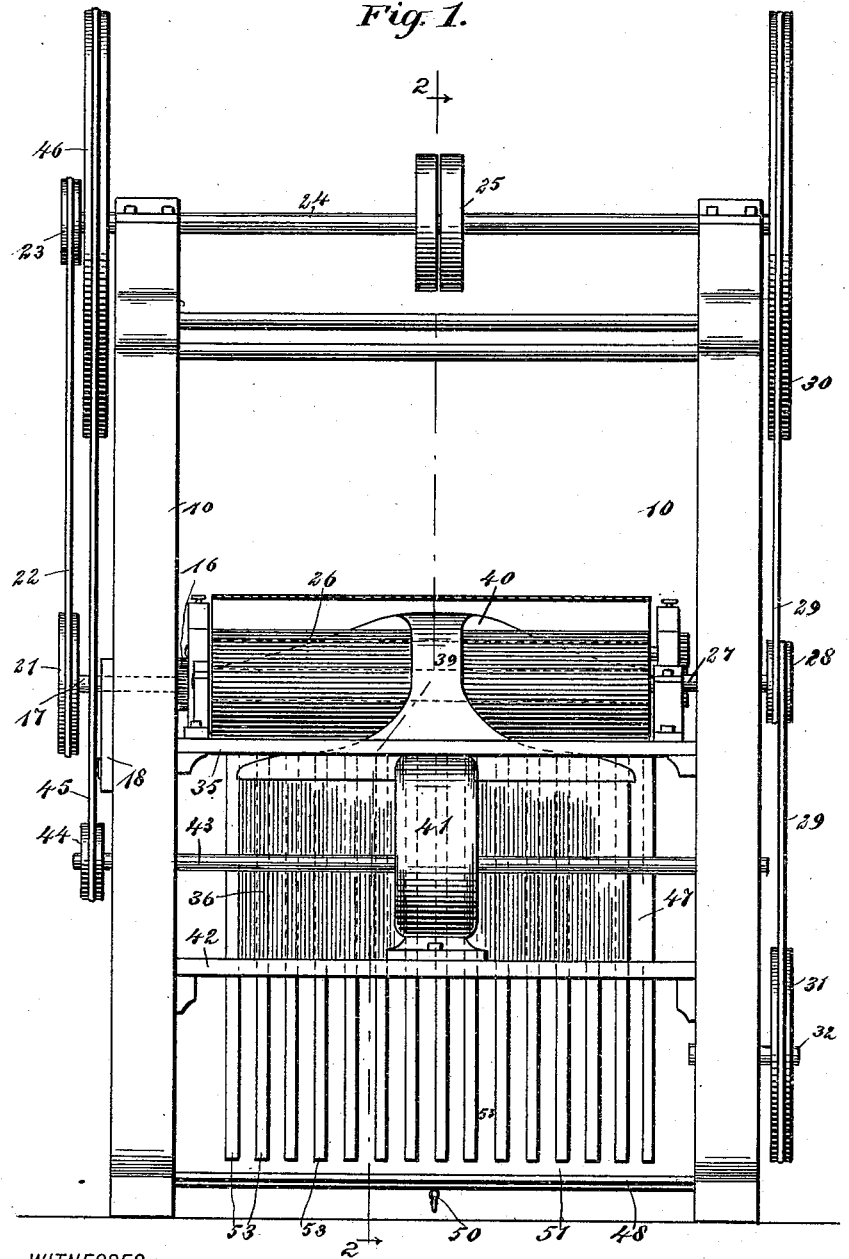

(No Model.) 2 Sheets—Sheet 1.

J. H. SANDERS & J. E. CARLIN.
MACHINE FOR CARROTTING FUR.

No. 478,470. Patented July 5, 1892.

WITNESSES:

INVENTORS:
J. H. Sanders
J. E. Carlin
BY
ATTORNEYS.

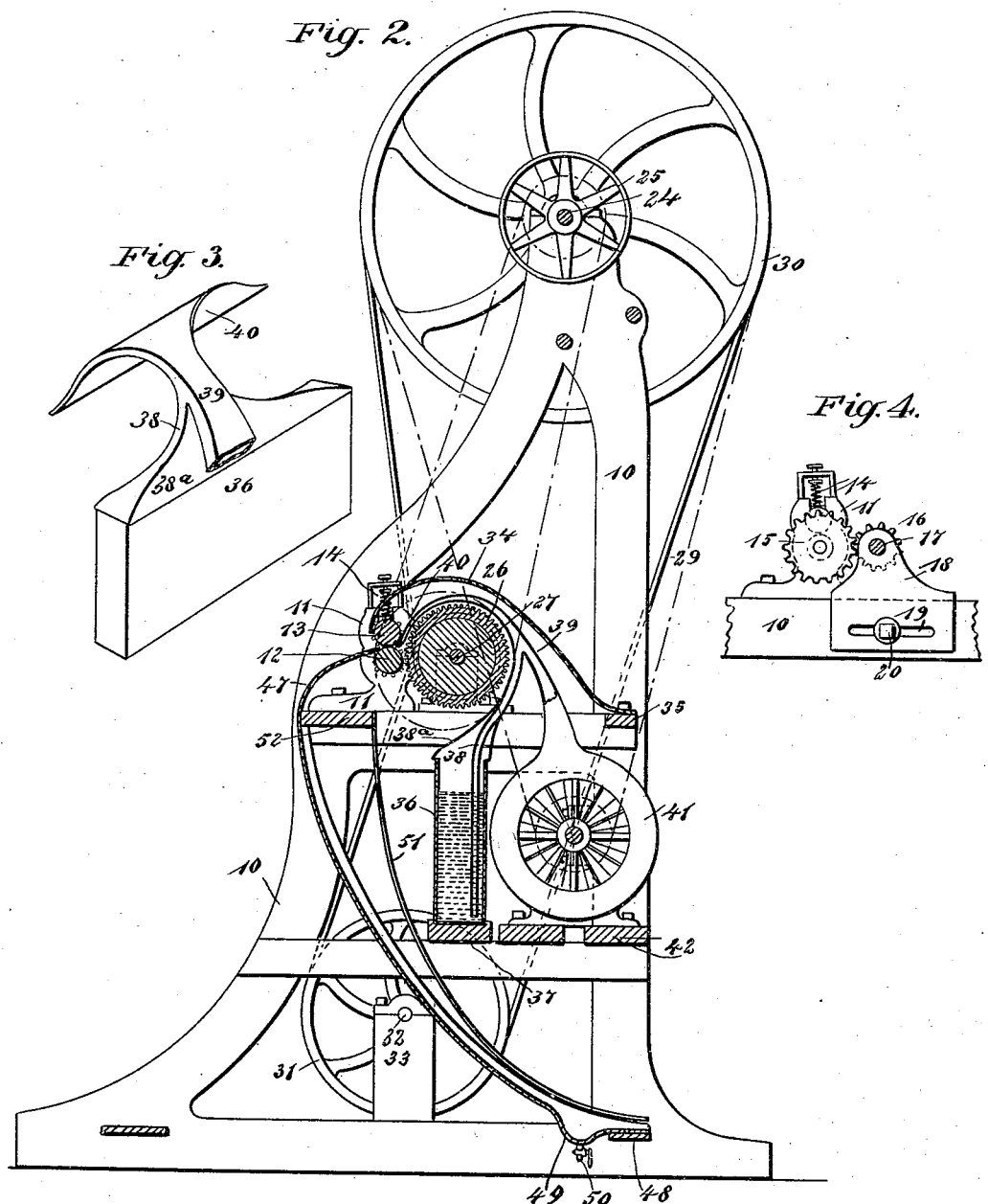

UNITED STATES PATENT OFFICE.

JOHN H. SANDERS, OF NEW YORK, AND JAMES E. CARLIN, OF BROOKLYN, NEW YORK.

MACHINE FOR CARROTTING FUR.

SPECIFICATION forming part of Letters Patent No. 478,470, dated July 5, 1892.

Application filed March 8, 1892. Serial No. 424,176. (No model.)

*To all whom it may concern:*

Be it known that we, JOHN H. SANDERS, of New York city, in the county of New York, and JAMES E. CARLIN, of Brooklyn, in the county of Kings, State of New York, have invented a new and Improved Machine for Carrotting Fur, of which the following is a full, clear, and exact description.

Our invention relates to improvements in carrotting machines—that is, in machines for carrotting fur; and the object of our invention is to produce a simple, durable, and rapidly-operating machine, which is adapted to carrot furs and fit them for use in hat-making in a more perfect manner than said work can be done by hand, and which is also constructed so as to deliver a fine spray of the carrotting liquid upon the fur and save the surplus solution, so that there will be no waste.

To this end our invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken rear elevation, partly in section, of the machine embodying our invention. Fig. 2 is a vertical section on the line 2 2 in Fig. 1. Fig. 3 is a broken detail perspective view of the atomizer used in connection with the machine, and Fig. 4 is a broken detail view of the mechanism for driving the feed-rollers.

The machine is provided with an upright substantial frame 10, in one side of which are parallel feed-rollers 12 and 13, which are mounted one above the other and journaled in supports 11 on opposite sides of the machine-frame. The supports 11 are slotted vertically, and the upper feed-roller 13 is journaled in the slots and is adjustable vertically, the roller being cushioned by springs 14 in a common and well-known manner, the upper roller being cushioned, so as to provide for the varying thicknesses of the skins.

The rollers 12 and 13 are geared together at one end, as shown in Fig. 2, and at the opposite end one of the rollers is provided with a gear-wheel 15, which meshes with a pinion 16 on a counter-shaft 17, and the latter is journaled in a support 18, which is secured to the frame 10 and which is adjustable to and from the rollers, the support having a horizontal slot 19 near the bottom, which receives a fastening-bolt 20, adapted to hold it to the frame. On the outer end of the shaft 17 is a grooved pulley 21, (see Fig. 1,) and this is driven by a belt 22, extending upward to a pulley 23 on the main shaft 24, which is journaled in the top of the frame and provided with driving-pulleys 25.

Immediately behind the feed-rollers 12 and 13 is a revoluble brush 26, which is arranged parallel with the rollers and journaled in suitable bearings, the brush being adapted to engage the fur as it passes between it and the lower roller 12. The brush is made, preferably, of corrugated rubber, although it may be made of other suitable material, and the shaft 27, to which it is secured, is provided at one end with a pulley 28, which is driven by a belt 29, the latter extending upward over a pulley 30 on the shaft 24 and downward around a pulley 31 on a counter-shaft 32, which is journaled in a support 33 near the bottom of the frame.

The brush 26 and the upper roller 13 are protected by a hood 34, which covers the roller and brush and which extends backward and downward through the machine-frame, the rear end of the hood being secured to a cross-bar 35 on the frame. The object of the hood is to prevent the carrotting solution from flying, as this solution consists of dilute nitrate of mercury and is very injurious to the skin of a person.

Beneath the brush 26 and extending around and over it is an atomizer, which is constructed and arranged so as to deliver the carrotting solution upon the fur before it passes to the brush. The atomizer is provided with a tank 36, which is supported on a cross-bar 37 in the machine-frame, and the tank is provided with an outlet-pipe 38, which extends downward to a point near the bottom of the tank, as shown in Fig. 2, and which merges with the tank-top 38ª. The upper end of the pipe 38 is flattened and enters a flat pipe 39, which is curved, so as to extend over the upper side of the brush 26, and which is widened at its free end, as shown at 40 in Figs. 1 and 3, and delivers upon and above the lower roller 12. The lower end of the pipe 39 is connected with a common form of blower 41, which is supported on cross-bars 42 in the machine-frame and which is driven by a shaft 43, journaled in the machine-frame and having a pulley 44 at one end, which is driven by a belt 45, extending over a pulley 46 on the main shaft 24. It will be seen then that when the fur is inserted between the rollers 12 and 13 and is fed downward between the lower roller and the brush the blower will also be operated, and the current of air which passes up through the pipe 39 sucks up the carrotting solution in the tank 36 and delivers the same in a fine spray upon the fur, thus thoroughly impregnating the fur with the solution and fitting it for the action of the brush, which by pressing the fur against the lower roller 12 and engaging it with its rapidly-rotating teeth or corrugations causes the solution to be thoroughly worked into the fur.

A curved guard-plate 47 is secured in the front portion of the machine-frame, the upper end extending inward to a point between and almost touching the feed-rollers 12 and 13, and the lower portion of the guard extends rearward and downward through the machine-frame, the extreme lower end being supported on a cross-piece 48. Near the lower end of the guard-plate is a depending bend 49, which forms a small tank and which has a cock-controlled outlet 50. The guard-plate prevents the carrotting solution from flying forward upon the operator, and it also prevents the waste of the solution, as the surplus solution which drops from above will be caught upon the guard-plate and will run down into the tank 49, from which it may be drawn when necessary.

In the rear of the guard-plate is a fur-guide 51, which is very similar to the guard-plate in shape, and the upper end of the guide is fixed to a cross-bar 52 near the front side of the machine. The fur-guide 51 comprises a plurality of parallel arms 53, which are united at the bottom, and this construction enables any surplus solution to drip through upon the guard-plate and also holds the fur away from the guard-plate, and the fur when it drops from the brush 26 and roller 12 will be delivered by the guide-plate to the rear end of the machine.

The operation of the machine is as follows: The feed-rollers 12 and 13, the brush 26, and the blower 41 are in constant motion, and the operator feeds the skins or fur to be carrotted one after another to the rollers 12 and 13. The skins are carried inward and downward by the rollers and pass between the lower roller 12 and the brush 26. At this point the solution of nitrate of mercury or its equivalent is delivered upon and into the fur by the atomizer. The solution is then smoothed off by the brush and the skin or fur is delivered upon the guide-plate 51, from which it slides to the rear end of the machine.

Having thus described our invention, we claim as new and desire to secure by Letters Patent—

1. A carrotting-machine comprising a pair of feed-rollers, a revoluble brush arranged behind the rollers and parallel therewith, and an atomizer adapted to deliver between the brush and the lower feed-roller, substantially as described.

2. A carrotting-machine comprising a pair of feed-rollers, a revoluble brush arranged adjacent to the feed-rollers and parallel therewith, an atomizer adapted to deliver between the brush and rollers, and a blower connected operatively with the atomizer, substantially as described.

3. The combination, with the feed-rollers and the brush arranged adjacent thereto, of the atomizer comprising a tank, a curved outlet-pipe extending upward from the tank, a blower arranged adjacent to the tank, and a pipe leading from the blower and extending over the top of the brush, said blower-pipe being connected with the outlet-pipe of the tank, substantially as described.

4. The combination, with the feed-rollers and brush, of an atomizer comprising a tank having a suitable outlet-pipe and a blower having a pipe extending over the top of the brush and delivering between the brush and rollers, the said blower-pipe being connected with the tank-outlet and having its free end widened, substantially as described.

5. In a carrotting-machine, the combination of the feed-rollers, the brush arranged near them, the atomizer adapted to deliver between the rollers and brush, and a hood held to cover the brush and rollers, substantially as described.

6. The combination of the feed-rollers, the revoluble brush, and a liquid-supply apparatus arranged to deliver between the brush and rollers, a curved guard-plate extending at an inclination below the brush and rollers, and a receiving-tank connected with the guard-plate, substantially as described.

7. The combination of the feed-rollers, the revoluble brush arranged near them and parallel therewith, a liquid-supply apparatus to deliver between the brush and rollers, and the curved guard-plate having its upper end extending between the rollers and its lower portion extending downward and terminating in a receiving-tank, substantially as described.

8. The combination of the feed-rollers, the revoluble brush, the liquid-supply apparatus to deliver between the brush and rollers, the guard-plate arranged below the brush and rollers, and the curved and slotted guide-plate supported above the guard-plate and between it and the brush and rollers, substantially as described.

JOHN H. SANDERS.
JAMES E. CARLIN.

Witnesses:
GOTTLIEB MÜLLER,
URIAH E. WOOD.